United States Patent [19]

Daniel

[11] 4,212,767
[45] Jul. 15, 1980

[54] METHOD OF PREPARING AN OXIDATION CATALYST CONTAINING A MOLYBDATE ANION

[75] Inventor: Chelliah Daniel, Boothwyn, Pa.

[73] Assignee: Air Products and Chemicals, Inc., Allentown, Pa.

[21] Appl. No.: 952,177

[22] Filed: Oct. 17, 1978

[51] Int. Cl.² .......................... B01J 27/14; B01J 27/24; B01J 27/02; B01J 27/06

[52] U.S. Cl. ................................... 252/435; 252/437; 252/438; 252/439; 252/441; 252/454; 252/456; 252/458; 252/462; 562/546

[58] Field of Search ............... 252/435, 437, 438, 439, 252/441, 454, 458, 462, 456

[56] References Cited

U.S. PATENT DOCUMENTS

| | | | |
|---|---|---|---|
| 3,888,886 | 6/1975 | Young et al. | 252/437 X |
| 4,042,533 | 8/1977 | Shaw et al. | 252/437 |
| 4,056,487 | 11/1977 | Ken | 252/435 |
| 4,070,397 | 1/1978 | White et al. | 252/435 X |
| 4,105,586 | 8/1978 | Ken | 252/437 |

*Primary Examiner*—Delbert E. Gantz
*Assistant Examiner*—William G. Wright
*Attorney, Agent, or Firm*—Richard A. Dannells, Jr.; Barry Moyerman

[57] ABSTRACT

A method of preparing an oxidation catalyst which comprises combining in an aqueous solution, an acid or salt of molybdenum with a water-soluble acid or nonmetallic salt of silicon, phosphorus or arsenic, which is capable of forming a polyhedra of molybdenum. An aqueous chloride ion and a compound of phosphotungstate, silicotungstate, vanadium arsenate, silicoarsenate, phosphovanadate, silicovanadate or corresponding acids thereof or mixtures thereof are then added to the mixture. The resulting combination is dried and calcined to yield the finished catalyst.

The oxidation catalyst has the following empirical formulua:

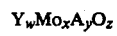

$$Y_w Mo_x A_y O_z$$

where Y is phosphorus, arsenic, silicon or mixtures thereof,

A is tungsten, vanadium, arsenic, when Y is not arsenic, or mixtures thereof,
  w ranges from 0.5 to 1.5,
  x ranges from 10 to 15,
  y ranges from 0.1 to 2.0, and
  z ranges from 1 to 42, and is an integer necessary to satisfy the valency requirements of the formula.

17 Claims, No Drawings

METHOD OF PREPARING AN OXIDATION CATALYST CONTAINING A MOLYBDATE ANION

BACKGROUND OF THE INVENTION

1. Field of the Invention

The invention is directed to a method for preparing an active oxidation catalyst, and more particularly to a catalyst useful in the oxidation of alpha, beta, unsaturated carboxylic aldehydes to the corresponding acids, as well as the production of unsaturated aldehydes and acids from the corresponding alcohols and olefins.

2. Description of the Prior Art

The prior art methods for preparing oxidation catalysts useful in the preparation of unsaturated carboxylic acids and aldehydes include a step which results in the formation of inactive molybdenum compounds. One example of such a prior art method is disclosed in U.S. Pat. No. 3,965,163. In this method, a suitable source of antimony such as antimony trichloride is dissolved in hydrochloric acid and combined with phosphomolybdic acid. To this acidic solution is added a suitable source of tungsten such as tungsten trioxide. The resulting mixture is dried and calcined to form a catalyst having the following empirical formula:

$$Sb_1Mo_{12}W_1P_1O_{41.5}$$

Other prior art references which disclose similar methods for preparing oxidation catalysts containing molybdenum include U.S. Pat. Nos. 3,875,220; 3,925,464; 3,976,688; 3,998,877; 4,017,423; 4,042,533; 4,042,625; 4,045,478; 4,051,179; 4,070,397; 4,072,708; 4,075,123; 4,075,124 and 4,075,244 and U.K. Pat. No. 1,465,916.

SUMMARY OF THE INVENTION

In contrast to the prior art methods of preparing oxidation catalysts, the method of the present invention results in the formation of a catalyst having a high state of purity of the active molybdate anion. A critical feature of this method utilizes a chloride ion stabilization step which eliminates the prior art method of requiring precise pH control during the crucial stages of the catalyst preparation. It has even been found that the incorporation of metal cations in the oxidation catalyst is not essential to achieving a highly active state.

In accordance with the presently claimed method, a molybdate acid or non-metallic molybdate salt is combined with a water-soluble, non-metallic acid or salt of an element selected from the group consisting of silicon, phosphorus and arsenic in an aqueous solution, and then to the mixture are added an aqueous chloride ion and a compound selected from the group consisting of phosphotungstate, silicotungstate, vanadium arsenate, silicoarsenate, phosphovanadate, silicovanadate, corresponding acids thereof and mixtures thereof. The resulting combination is dried and calcined to yield a catalyst having an empirical formula:

$$Y_wMo_xA_yO_z$$

where Y is phosphorus, arsenic, silicon or mixtures thereof,

A is tungsten, vanadium, arsenic, when Y is not arsenic, or mixtures thereof, w ranges from 0.5 to 1.5, x ranges from 10 to 15, y ranges from 0.1 to 2.0, and z ranges from 1 and 42, and is an integer necessary to satisfy the valency requirements of the formula.

PREFERRED EMBODIMENTS OF THE PRESENT INVENTION

Although the foregoing catalyst has been found to have high oxidation activity without the incorporation of metallic cations, even greater activity can be imparted to the catalyst if such a cation is incorporated during the chloride ion stabilization step of the method of the present invention. Such metals can be selected from the group consisting of aluminum, antimony, barium, bismuth, cadmium, calcium, cerium, chromium, cobalt, copper, iron, lanthanum and other rare earths, lead, magnesium, manganese, nickel, potassium, rhenium, rhodium, ruthenium, silver, strontium, thallium, titanium, zinc, zirconium, and mixtures thereof.

The non-metallic molybdate salts used in the catalyst preparation include ammonium molybdate [$(NH_4)_2MoO_4$] and ammonium heptamolybdate [$(NH_4)_6Mo_7O_{24}\cdot 4H_2O$], molybdic acid, molybdic oxide and molybdenum trioxide. For the preparation of catalysts containing cations in addition to the molybdates salts referred to above, any metallic molybdate can be used such as barium molybdate, calcium molybdate, iron molybdate, lead molybdate, potassium molybdate and strontium molybdate. it is critical when the metallic molybdate salts are employed that the final catalyst has a total metal cation to molybdate ratio in the range of about 1:10 to about 1:13.

The compound of silicon, phosphorus or arsenic for the catalyst preparation can be an acid or a non-metallic silicate, phosphate or arsenate such as ammonium silicate, ammonium phosphate, ammonium arsenate, phosphoric acid, orthoarsenic acid, metaarsenic acid, pyroarsenic acid, arsenous oxide, arsenous hydride, hypophosphoric acid, methaphosphoric acid, orthophosphoric acid, pyrophosphoric acid, hypophosphorous acid, orthophosphorous acid, and pyrophosphorous acid.

The chloride ion stabilization (CIS) step takes place in the presence of concentrated hydrochloric acid or other material such as an aqueous solution of ammonium chloride having a high concentration of chloride ions at temperatures in the range of 20° to 80° C. In the case of the metal cation-containing catalyst, all or a part of the chloride ion can come from the chloride of one or more of the cations incorporated into the catalyst during this CIS step.

The presence of the chloride ion is critical for the uniform formation of the active molybdenum species and to avoid the conflicting influence that pH tends to have on the aqueous solution during the method of the present invention. The preferred results are obtained when the chloride ion is present in the CIS step in the ratio of one equivalent of chloride ion to one equivalent of molybdenum, but the chloride can range in concentration as high as five equivalents per equivalent of molybdenum. Although most, if not all of the optional metal cation is incorporated into the catalyst during the CIS step, the cations can also be added with the molybdate salts as discussed above.

A suitable form of the metal cation that can be incorporated into the catalyst if desired, includes the halides, oxides, nitrates, ammonium salts, hydroxides, acetates, carbonates, sulfates and the like. A particularly useful form is the chloride of Al, Sb, Ba, Bi, Cd, Ca, Ce, Cr, Co, Cu, Fe, La, Pb, Mg, Mn, Ni, Nd, K, Pr, Re, Rh, Ru, Ag, Sr, Tl, Ti, Zn, Zr, and mixtures thereof. The total metal cation to molybdenum mole ratio should be in the range of 1 mole cation to about 10 moles molybdenum to 1 mole cation to about 13 moles molybdenum.

The empirical formula for the catalyst containing one or more of the above cations is:

$$X_u Y_w Mo_x A_y O_z$$

where X is one of the cations listed above, or mixtures thereof;

u ranges from 0.5 to 2.0; and

Y, A, w, x, y and z are the same as that set forth above in the SUMMARY OF THE INVENTION.

The tungsten, vanadium arsenic, or mixtures of elements are present in the catalyst, preferably so that the mole ratio is 0.25 to 2.0 moles to about 12 moles molybdenum. The best results are obtained where the elements are incorporated into the catalyst in an aqueous solution of phosphotungstate, phosphotungstic acid or similar heteropoly anion-containing compounds.

When the CIS step is not followed or when the raw materials exceed the mole limits given, inactive molybdenum species are formed in solution. In has been found that when the chloride ion is not present, the molybdenum species may exist in solution in different inactive forms rather than being present as the active molybdate anion. The presence of chloride ion also maintains the molybdenum species in a very highly complexed form, which is the active species. For example, the addition of the preferred phosphorus element creates the active phosphomolybdate anion precursor in solution, and the chloride ion stabilizes this anion during the remaining steps of the catalyst preparation. The most preferred results are obtained when molybdenum is present as the 12-phosphomolybdenum anion. However, similar results are obtained from isomorphous heteropoly silico molybdates, arseno molybdates or mixtures thereof.

The foregoing method of preparation using the ratios of the raw materials set forth above prevents the formation of other molybdenum species which are structurally different and not active for the oxidation of carboxylic aldehydes to the acids. This method also prevents the formation of inactive molybdenum trioxide species during the drying and calcination steps, and thereby gives the substantially pure and entirely active molybdenum species. By maintaining the structural purity, one obtains an excellent catalyst with improved activity, selectivity and stability.

The addition of the optional metal cations in the ratio set forth above also prevents the formation of less selective regular molybdates, and also results in the elmination of excess metal oxides in the catalyst. In either case, the formation of catalysts having low stability is avoided.

The prior art form of the molybdenum compounds and other metal oxides tend to catalyze reactants to total combustion and to form oxygenated products which tend to decrease the selectivity to, for example, acrylic and methacrylic acids and to decrease the structural stability of the catalysts. Therefore, the formation of metal oxides and such molybdenum compounds must be avoided.

Preferably, phosphotungstic acid is employed in the formation of the catalysts prepared by the present method in the ratio 0.5–1.0 moles per mole of molybdenum to form the isomorphous phosphotungsto molybdate anion. Using these small ratios, the phosphotungstic acid helps to form the most active distorted phosphomolybdate anion having a very stable structural stability and flexibility.

After the chloride ion stabilization step, the resulting mixture is dried at temperatures of 75° to 150° C., and the dried product is calcined in air at temperatures from 150° to 500° C., preferably 200° to 420° C. for a period of 1 to 48 hours. The calcined catalyst can then be ground to increase its surface area to a range of 35 to 100 mesh having a surface area of 0.1 to 50 m²/g.

If desired, the catalyst can be supported on any known carrier such as silica, alumina, Alundum, zeolites, graphite, pumice, silicon carbide, zirconia, titania or other inert carrier. The catalysts used in the method of the present invention can be coated onto or otherwise incorporated in the carrier in the range of about 10 to 100% by weight of calalyst based on the weight of the carrier. This can be accomplished by any of the various means well-known to those skilled in the art.

The catalysts of the present invention can be used to oxidize unsaturated aldehydes such as acrolein and methacrolein in the presence of molecular oxygen to yield acrylic acid and methacrylic acid, respectively. The oxygen may be in the form of pure oxygen, oxygen diluted with inert gases, air with or without additional oxygen. The oxidation reaction can be in either a fixed or fluidized catalyst bed at temperatures in the range of 200° to 475° C., preferably from 250° to 375° C., pressures from 0.5 to 50 atmospheres, preferably 1 to 10 atmospheres absolute. The residence time of the reactants in the presence of the catalyst ranges from 0.2 to 30 seconds, preferably from 1 to 20 seconds. The ratio of oxygen to unsaturated aldehydes in the feed gas ranges from 1:1 to 10:1, preferably from 1:1 to 3:1.

Preferably, steam is added to the gaseous reaction mixture to improve the yield of unsaturated carboxylic acids from the aldehydes. Helium, nitrogen, saturated hydrocarbons such as methane, propane, butane or the like, or other inert gases can also be added to the gaseous reactant mixture. The concentration of steam ranges from 2 to 80%, preferably from 10 to 50% of the volume of the feed.

In addition to the production of unsaturated carboxylic acids, the catalysts of this invention can be employed in the oxidation of unsaturated monoolefins such as propylene and isobutylene to the corresponding unsaturated acid and/or aldehydes such as acrylic and methacrylic acid and acrolein and methacrolein. A preferred reaction mixture for the oxidation of monoolefins comprises one mole of olefin to 1.5 to 3 moles of molecular oxygen and 0.5 to 20 moles of water in the form of steam. The reaction takes place at temperatures in the range of 300° to 450° C., preferably 360° to 410° C., 1 to 10 atmospheres, preferably 2 to 4 atmospheres absolute and a residence time of 0.1 to 10, preferably about 0.5 to 3 seconds.

The method of the present invention can also be extended to prepare other molybdate catalysts which are useful in a wide variety of other chemical processes including dehydrogenation, ammoxidation and dehydrocyclization.

The following examples illustrate embodiments of this invention. It is to be understood, however, that these are for illustrative purposes only and are not intended to be wholly definitive as to the operating conditions and scope for the preferred practice of the method of the present invention.

EXAMPLE 1

A quantity of 210.0 grams of ammonium molybdate were dissolved in 600 ml. of water. 13.2 grams of diammonium phosphate were dissolved in 100 ml. of water and then added to the ammonium molybdate solution. During the chloride ion stabilization (CIS) step, 25 cc of concentrated hydrochloric acid and 20 grams of phosphotungstic acid dissolved in 15 ml. of water were added to the aqueous solution of reactants. The mixture was then dried at 85° C. and calcined at 350° C. for 6 hours. Under these conditions, the resulting catalyst composition was found to be essentially free of chloride ion by elemental analysis. The presence of the chloride ion is believed to be detrimental to the catalyst activity in the preparation of oxygenated unsaturated hydrocarbons.

The resulting catalyst had an empirical formula as follows:

$$P_{1.09}Mo_{12}W_{0.9}O_x$$

where x is an integer to meet the valency requirements of the formula.

The catalyst was then ground to a uniform particle size in the range of from about 500 to 600 microns. The catalyst was subjected to infrared spectroscopy, X-ray diffraction and surface acidity measurements. From these characterization methods, it was confirmed that the active component in the catalyst is a distorted phosphomolybdate anion. In addition, it was confirmed that no other molybdates or molybdenum trioxide compounds were present in the catalyst.

The resulting catalyst was placed in a fixed bed, stainless steel reactor 18 inches (46 cm.) in length and 5/6 inch (1.65 cm.) inside diameter. The reactor was inserted to a length of 12 inches (30 cm.) in a heated zone to convert methacrolein to methacrylic acid under the following reaction conditions to achieve the following results:

Feed: Methacrolein : Oxygen : Steam : Helium
    4.1%    8.35%    12.5%    75.0% by volume
Temperature: 320° C.
Pressure: Atmospheric
Residence Time: 1.32 seconds
Space Velocity: 2730 hr.$^{-1}$
Conversion, mole %:
$$\frac{\text{Total reacted methacrolein}}{\text{Methacrolein in the feed}} \times 100 = 84.1\%$$
Selectivity of Methacrylic Acid, mole %:
$$\frac{\text{Methacrylic acid formed}}{\text{Total reacted methacrolein}} \times 100 = 87.0\%$$
Selectivity of Acetic Acid, mole %:
$$\frac{\text{Acetic acid formed}}{\text{Total reacted methacrolein}} \times 100 = 8.6\%$$

EXAMPLE 2

The catalyst preparation procedure of Example 1 was followed to yield a catalyst having the following structural formula:

$$P_{1.12}Mo_{12}W_{1.2}O_x$$

This catalyst was run under exactly the same oxidation conditions as the catalyst of Example 1. The resulting conversion to methacrylic acid was 83.3% and the selectivity of methacrylic acid was 87.2% and of acetic acid was 9.2%.

EXAMPLE 3

The Example 1 catalyst preparation procedure was again followed to yield a catalyst having the following formula:

$$P_{1.18}Mo_{12.0}W_{1.8}O_x$$

This catalyst was employed under the same conditions that were followed in Example 1 to produce methacrylic acid. The catalyst has an 80.1% conversion and a selectivity of methacrylic acid equal to 82.7%, and of acetic acid equal to 12.1%.

The foregoing data of Examples 1-3 illustrates that even without the addition of a metal cation during the catalyst formulation, the oxidation activity was very high when compared to other prior art catalysts which contain one or more metal cations.

EXAMPLE 4

The catalyst procedure of Example 1 was generally followed except that the CIS step was varied to illustrate the improvement one can make in the already high activity of the catalyst of the present invention by the incorporation of at least one metal cation.

During the CIS step, 22.6 grams of antimony trichloride were dissolved in 6 cc of concentrated hydrochloric acid and diluted with 20 cc water. This solution was added to the aqueous solution resulting from a combination of the ammonium molybdate and diammonium phosphate. 15 grams of phosphotungstic acid dissolved in 50 ml. water were then added to the mixture and the slurry was dried to 85°C. and calcined at 350° C. for 6 hours. The empirical formula of the catalyst is set forth in Table I below.

After the catalyst was ground to reduce the size to about 560 microns, the oxidation reaction of Example 1 was followed to convert methacrolein to methacrylic acid except that the temperature was lowered from 320° C. to 304° C. and the residence time was increased from 1.32 to 3 seconds (1200 hr.$^{-1}$ space velocity). The conversion was 89.0% with a selectivity of methacrylic acid equal to 96.2% and of acetic acid equal to only 0.98%.

EXAMPLE 5

The catalyst procedure of Example 4 was followed except that during the CIS step in place of the 22.6 grams of antimony trichloride were added a mixture of 26.1 grams of lead nitrate and 6.5 grams of cobalt mixture. The resulting catalyst was reacted under the same oxidation conditions of Example 4 to achieve the results set forth in Table I below.

EXAMPLE 6

The catalyst procedure of Example 4 was generally followed except for the following modifications. During the CIS step, 14.5 grams of lead nitrate and 7.5 grams of cobalt nitrate were dissolved in 6 cc of concentrated hydrochloric acid and diluted with 20 cc water. 30 grams of phosphotungstic acid dissolved in 50 ml. water were added to the mixture of lead nitrate, cobalt nitrate, ammonium molybdate and diammonium phosphate already combined and in solution. The results of this catalyst in the oxidation of methacrolein under the Example 4 conditions are also given in Table I below.

EXAMPLE 7

The catalyst procedure of Example 6 was followed except that in place of the 14.5 grams of lead nitrate and 7.5 grams of cobalt nitrate were added, 7.5 grams of barium nitrate, 8.3 grams of lead nitrate, 3.5 grams of cobalt nitrate and 7.5 grams of strontium nitrate. The results of the use of this catalyst in the oxidation of methacrolein under the Example 4 conditions are set forth in Table I below.

In all of the catalyst procedures described in Examples 4–7, the metal cation to molybdenum ratio was 1:12.

CONTROL 1

A control catalyst was prepared using the procedure of Example 4 except that the step of incorporating 20 grams of phosphotungstic acid was eliminated. The catalyst was employed in the oxidation of methacrolein using the same conditions as Example 4. The results are also given in Table I below.

EXAMPLE 8

This example illustrates the unique properties of the method of this invention in producing a highly active catalyst capable of oxidizing acrolein to acrylic acid under the identical conditions described in Example 4. The conversion of acrolein to acrylic acid using the same $Sb_1P_{1.09}Mo_{12}W_{0.9}O_x$ catalyst of Example 4 was 89.6% conversion and a selectivity of acrylic acid equal to 88.8% and of acetic acid equal to 6.2% were obtained.

The foregoing examples clearly illustrate the extraordinary characteristics of the catalysts which contain the essentially pure phosphomolybdate anion in selectively oxidizing unsaturated carboxylic aldehydes to the corresponding acids.

What is claimed is:

1. A method of preparing a catalyst comprising:
  (a) combining a molybdic acid or non-metallic molybdate salt with a water-soluble, acid or non-metallic salt of an element selected from the group consisting of silicon, phosphorus, arsenic and mixtures thereof in an aqueous solution,
  (b) adding an aqueous chloride ion and a compound selected from the group consisting of phosphotungstate, silicotungstate, vanadium arsenate, silicoarsenate, phosphovanadate, silicovanadate, corresponding acids thereof and mixtures thereof,
  (c) drying the resulting combination, and
  (d) calcining the dried material to yield a catalyst having the empirical formula:

$$Y_wMo_xA_yO_z$$

where Y is phosphorous, arsenic, silicon or mixtures thereof,

A is tungsten, vanadium, arsenic when Y is not arsenic, or mixtures thereof, w ranges from 0.5 to 1.5, x ranges from 10 to 15, y ranges from 0.1 to 2.0, and z ranges from 1 to 42 and is an integer necessary to satisfy the valency requirements of the formula.

2. The method of claim 1 wherein a cation is incorporated into the said catalyst by adding a salt in step (b) of an element selected from the group consisting of Al, Sb, Ba, Bi, Cd, Ca, Ce, Cr, Co, Cu, Fe, La, Pb, Mg, Mn, Ni, Nd, K, Pr, Re, Rh, Ru, Ag, Sr, Tl, Ti, Zn, Zr, and mixtures thereof.

3. The method of claim 1 wherein the concentration of the chloride ion during step (b) ranges from 1 equivalent of the ion per 1 of molybdenum to 5 equivalents of the ion per one of molybdenum.

4. The method of claim 1 wherein the ratio of A in the empirical formula to Mo ranges from 0.25 mole A to 12 moles Mo to about 2 moles A to 12 moles Mo.

TABLE I

| EXAMPLE | CATALYST | CONV. | SELECTIVITY METHACRYLIC ACID | ACETIC ACID |
|---|---|---|---|---|
| 4 | $Sb_1P_{1.09}Mo_{12}W_{0.9}O_x$ | 89.0% | 96.2% | 0.981% |
| 5 | $Co_{0.21}Pb_{0.78}P_{1.09}Mo_{12}W_{0.9}O_x$ | 76.4% | 77.4% | 8.0% |
| 6 | $Co_{0.5}Pb_{0.5}P_{1.18}Mo_{12}W_{1.18}O_x$ | 64.2% | 95.1% | 1.0% |
| 7 | $Ba_{0.25}Co_{0.25}Sr_{0.25}Pb_{0.25}P_{1.18}Mo_{12}W_{1.18}O_x$ | 60.7% | 90.1% | 1.5% |
| CONTROL 1 | $Sb_1P_1Mo_{12}O_x$ | 36.8% | Trace | Nil |

Table I above illustrates the unexpected results one obtains from the catalysts of the method of the present invention which contain the defect heteropoly phosphomolybdate anion compared to the results one obtains from a catalyst containing antimony phosphomolybdate of the type described in the prior art, for example, U.S. Pat. No. 3,965,163. The foregoing results also indicate that the major significant active species in the catalyst of the method of this invention is this defect heteropoly phosphomolybdate anion. One is not restricted to the incorporation of any metal cation or any particular composition in the method of preparation of such an active catalyst.

CONTROL 2

A second control catalyst was prepared using the catalyst proceduure of Example 1 except that no hydrochloric acid or other chloride ion-containing medium was used in the catalyst preparation to obtain a catalyst having the same empirical formula as that of Example 1, i.e.: $P_{1.09}Mo_{12}W_{0.9}O_x$.

Under the identical oxidation conditions, as described in Example 1, no appreciable reaction of methacrolein to methacrylic acid was observed. The oxidation temperature was then increased to 345° C. Under these conditions, the conversion was 61.7%, and a selectivity of methacrylic acid equal to 45.6% and of acetic acid equal to 17.5% were obtained.

The second control catalyst was subjected to the same characterization methods as the catalyst of Example 1 and showed the presence of considerable amounts of molybdenum trioxide along with phosphomolybdate. This is believed to be the cause for the poor activity of this control catalyst.

5. The method of claim 1 wherein said catalyst is substantially free of chloride ion.

6. The method of claim 1 wherein Y is P.

7. The method of claim 1 wherein A is W.

8. The method of claim 6 wherein A is W.

9. The method of claim 8 wherein phosphotungstic acid is added during step (b) in a ratio of 0.5 mole to 1 mole Mo to 1 mole to 1 mole Mo.

10. A method of preparing a catalyst comprising:
(a) combining a molybdic acid or molybdate salt with a water-soluble, acid or non-metallic salt of an element selected from the group consisting of silicon, phosphorus, arsenic and mixtures thereof in an aqueous solution,
(b) adding an aqueous choride ion, a compound selected from the group consisting of phosphotungstate, silicotungstate, vanadium arsenate, silicoarsenate, phosphovanadate, silicovanadate, corresponding acids thereof and mixtures thereof, and a halide, oxide, nitrate, ammonium salt, hydroxide, acetate, carbonate and sulfate of an element selected from the group consisting of Al, Sb, Ba, Bi, Cd, Ca, Ce, Cr, Co, Cu, Fe, La, Pb, Mg, Mn, Ni, Nd, K, Pr, Re, Rh, Ru, Ag, Sr, Tl, Ti, Zn, Zr, and mixtures thereof,
(c) drying the resulting combination, and
(d) calcining the dried material to yield a catalyst having the empirical formula:

$$X_u Y_w Mo_x A_y O_z$$

where X is an element selected from the group consisting of Al, Sb, Ba, Bi, Cd, Ca, Ce, Cr, Co, Cu, Fe, La, Pb, Mg, Mn, Ni, Nd, K, Pr, Re, Rh, Ru, Ag, Sr, Tl, Ti, Zn, Zr, and mixtures thereof;

Y is phosphorous, arsenic, silicon, or mixtures thereof,

A is tungsten, vanadium, arsenic when Y is not arsenic, or mixtures thereof, u ranges from 0.5 to 2.0, w ranges from 0.5 to 1.5, x ranges from 10 to 15, y ranges from 0.1 to 2.0, and z ranges from 1 to 42 and is an integer necessary to satisfy the valency requirements of the formula.

11. The method of claim 10 wherein Y is P.

12. The method of claim 10 wherein A is W.

13. The method of claim 10 wherein the ratio of X in the empirical formula to Mo ranges from 1 mole X to about 10 moles Mo to 1 mole X to 13 moles Mo.

14. The method of claim 10 wherein said catalyst is substantially free of chloride ion.

15. The method of claim 10 wherein phosphotungstic acid is added during step (b) in the ratio of 0.5 mole to 1 mole Mo to 1 mole to 1 mole Mo.

16. The method of claim 10 wherein a mixture of a nonmetallic molybdate salt and a metallic molybdate salt is added during step (a) and the ratio of X in the empirical formula to Mo ranges from 1 mole X to about 10 moles Mo to 1 mole X to 13 moles Mo.

17. The method of claim 11 wherein A is W.

* * * * *

UNITED STATES PATENT AND TRADEMARK OFFICE
CERTIFICATE OF CORRECTION

PATENT NO. : 4,212,767
DATED : 15 July 1980
INVENTOR(S) : Chelliah Daniel

It is certified that error appears in the above—identified patent and that said Letters Patent are hereby corrected as shown below:

Column 2, Line 31
    Delete "molybdate" and substitute therefor -- molybdenum --

Column 5, Line 37
    Delete "5/6" and substitute therefor -- 5/8 --

Signed and Sealed this

Twenty-fourth Day of February 1981

[SEAL]

Attest:

RENE D. TEGTMEYER

Attesting Officer     Acting Commissioner of Patents and Trademarks